Nov. 17, 1925.  1,561,684
F. H. BEYEA
BEAD CORE FOR PNEUMATIC TIRES
Filed Sept. 12, 1921
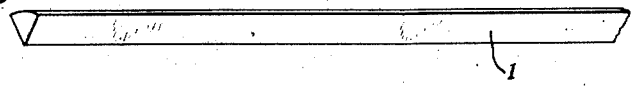
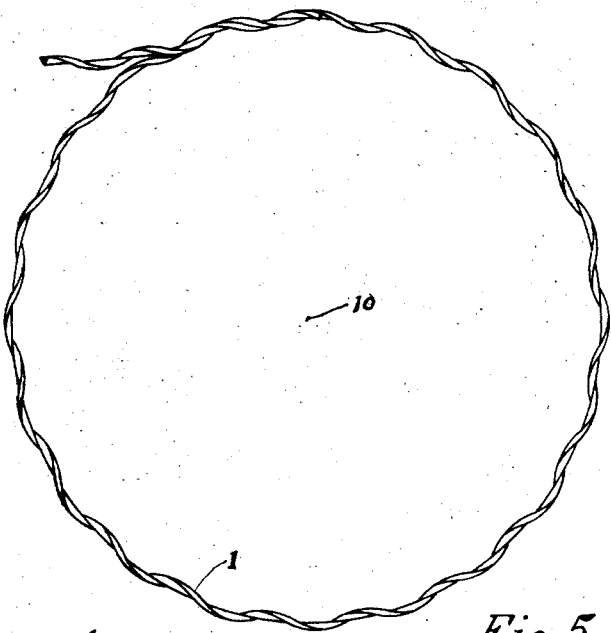
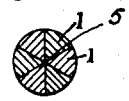
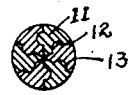
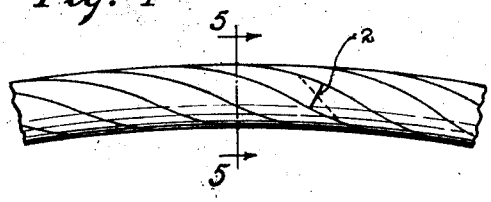
Inventor
Frank H. Beyea
By G. L. Ely
Atty.

Patented Nov. 17, 1925.

1,561,684

UNITED STATES PATENT OFFICE.

FRANK H. BEYEA, OF AKRON, OHIO, ASSIGNOR TO JOHN R. GAMMETER, OF AKRON, OHIO.

BEAD CORE FOR PNEUMATIC TIRES.

Application filed September 12, 1921. Serial No. 500,123.

*To all whom it may concern:*

Be it known that I, FRANK H. BEYEA, a citizen of the United States, residing at Akron, in the county of Summit, State of Ohio, have invented certain new and useful Improvements in Bead Cores for Pneumatic Tires, of which the following is a specification.

This invention relates to endless wire beads or gromets such as used in the manufacture of inextensible beads for use in pneumatic tires. Prior to my invention, it has been a practice in the art to use endless wire cables of round wire twisted into an endless cable, and it is customary in so manufacturing the beads to provide a central core wire around which the other wires of the bead are wound. The provision of a central core wire may be eliminated by the present invention and a solid bead obtained.

Other objects and advantages will be apparent as the description proceeds, and it will be understood that the showing and description are solely for the purpose of enabling the invention to be understood and I am entitled to a range of equivalents within the scope of the invention.

In the drawings there is shown one form of my invention, in which—

Fig. 1 is a view of one form of the wire which I propose to use in the construction of the endless bead of this invention;

Fig. 2 is this wire as it is crimped or spiraled ready for the winding operation;

Fig. 3 is a view showing the bead in the course of manufacture;

Fig. 4 is a view of the portion of the completed bead at the joint;

Fig. 5 is a cross-section on the line 5—5 of Fig. 4;

Fig. 6 is a cross-section of a modified form of wire, provided with one form of interlock between the several convolutions;

Fig. 7 is a section showing a second form of wire in which a core is used and in which the outer surface of the wire is roughened; and Fig. 8 is another section showing a wire provided with an interlocking arrangement and a roughened exterior surface.

As stated in the opening part of this specification, it is customary to manufacture the circular gromets or bead wires of one or more strands of round wire, which are twisted to make a cable construction. It is usual to build a bead about a central unspiraled core wire and then twist the outer covering wire about the core wire until it is covered. If the bead is made from a single length of wire it is customary to run out from the winding machine a length of wire sufficient to form the core or a section thereof, and then commence the covering operation by spirally shaping the wire and passing it about the core wire. In certain forms of the prior art, the end of the bead wire is run out for a short space after the winding operation without spiraling and then tucked within the center of the bead. The practise as outlined above is a time-consuming operation and increases the cost of the bead.

By my present invention I construct a bead wire which is solid and which in the preferred form does not have a central core, although it is considered within my invention to use a central core wire and wrap the covering wire of a peculiar shape thereabout to obtain a solid bead wire.

To assist in the understanding of the description the wire may be said to be bent about the center of the bead or gromet as about a major axis, and about itself in a spiral as about a minor axis.

To obtain the beneficial results given above, the wire from which my bead is constructed is made with converging sides in substantially sector shape. Such a wire is shown in the true sector shape at 1, but it will be understood that exact adherence to this form is not necessary, as the cross-section of the wire may be altered both as to the sharp edge at the inner point of the wire and the rounding or true circular exterior.

The wire of whatever form is now crimped or spiraled about the minor axis 5 in Fig. 2, the pitch of the spiral being so governed that when it is wound upon itself in the manner to be described, a solid gromet or bead is obtained. This spiraling may be done either as an incident to the wrapping operation or prior thereto.

The circular bead is now obtained by bending the wire about a major axis 10 until the proper circumference is reached, and then continuing the spiraling of the wire upon itself until the whole bead is filled up. This action is illustrated in Fig. 3 in which the winding operation is shown in its early stages.

When the wire is brought about upon itself a sufficient number of times, the end is cut so that it closely fits the first end of the wire. This forms the joint shown at 2 in Fig. 4. The bead ends may then be secured in any suitable manner. Soldering or welding may be used to join the ends of the wire, or a mechanical clip or fastener may be employed. The bead is then stretched to bring it to the proper size and to cause the spirals to lie closely and smoothly together.

In the stretching operation, one of the wires may be forced out of its position in the bead. As a modification to overcome this tendency, the construction shown in Figs. 6 or 8 or an equivalent thereof may be used.

In Fig. 6 the wire is shown at 11 and one converging side of the wire is provided with a ridge or projection 12 which is seated in a correspondingly shaped recess or groove 13 in the other side of the wire. As the wire is laid up in the bead the projection and recess mate and the several strands are interlocked, whereby displacement of any strand of the wire on stretching is prevented.

In the modification shown in Fig. 8, the wire 21 is substantially sector-shaped and is provided with a projecting lip or ridge on one side and with a corresponding groove 23 on the other side, at the circumference of the circle.

The bead construction is simple and effective and eliminates the use of a core wire, if the converging sides are carried to a point at the center of the bead as shown in all of the figures except Fig. 7. The outer surface of the wire is without crevices or grooves, if the true arc-shaped outer surface is used, as in Figs. 5 and 6, and the completed bead will be in true circular cross-section. The bead is solid throughout and without any interstices or crevices in its structure.

The smooth outer surface of the bead may be modified, as shown in Figs. 7 and 8, by providing in the outer surface of the wire a groove, such as shown at 24 in Fig. 7, or by rounding off the corners of the wire as shown at 25 in Fig. 8. In either of these cases the outer surface of the wire will be formed with spiral grooves which enable the rubber or other material forming the body of the tire bead to obtain a firmer hold on the bead than with the form shown in Figs. 5 and 6.

If desired, a central circular core wire or foundation 26 may be used, as shown in Fig. 7, in which case the outer or covering wire 27 is formed without an apex, but more nearly in the shape of a keystone, with tapering sides which converge toward the center of the bead.

Other modifications may be made without departing from the essential features of my invention, which comprise the use, in a bead core or gromet, of a wire having tapering sides so that the bead wire is solid throughout. The invention is not necessarily limited to bead cores for tires but may be extended to other uses.

What I claim is:—

1. A circular gromet comprising wire wound upon itself in a plurality of convolutions lying closely together, the wire having tapering sides.

2. A circular gromet comprising wire wound upon itself in a plurality of spiral convolutions about a minor axis, the said convolutions lying side by side and the sides of the wire in cross-section tapering toward the minor axis.

3. A circular gromet comprising wire wound upon itself in a plurality of spiral convolutions about a minor axis, the said convolutions lying side by side and the sides of the wire in cross-section tapering to a point at the minor axis.

4. A circular gromet comprising wire wound upon itself in a plurality of spiral convolutions, the said convolutions lying side by side, the wire in cross-section being substantially sector-shaped.

5. A circular gromet comprising a wire wound upon itself in a plurality of spiral convolutions, the ends of the wire abutting upon the outer surface of the gromet, the gromet being solid in cross-section.

6. A substantially entirely solid circular gromet with grooves on its outer surface.

7. A substantially entirely solid circular gromet composed of a single strand of wire wound upon itself.

8. A circular gromet composed of a single strand of wire which is substantially the shape of a sector of a circle wound upon itself in a plurality of spiral convolutions lying side by side, the said wire completely filling the center of the gromet.

9. A circular gromet comprising wire wound upon itself in a plurality of spiral convolutions, the said convolutions lying side by side, the wire being substantially sector-shaped in cross-section, and means to interlock the wires to prevent displacement radially outward of the gromet.

10. A circular gromet comprising a single wire wound upon itself in a plurality of spiral convolutions, the said convolutions lying side by side, the wire having tapering sides provided with a mating projection and recess to prevent radial displacement.

11. A circular gromet comprising a single wire which is spiraled on a minor axis, the wire being wound upon itself in a plurality of convolutions about a major axis, the said wire having tapering sides which converge toward the minor axis.

12. A circular gromet comprising a single wire which is spiraled about a minor axis and wound about a major axis, the wire being in cross-section of substantially the form of a sector of a circle, the center whereof coincides with the minor axis.

13. A circular gromet comprising a wire wound upon itself in spiral form, the wire being provided with a projection on its side which mates with a recess on the wire adjacent thereto.

14. A circular gromet comprising a wire having a projection on one side thereof and a recess on the other, the wire being spirally wound upon itself to form the gromet, whereby the projection on one side of the wire enters the recess upon the other side of the wire and interlocks the spirals against radial displacement.

15. A circular gromet comprising a wire wound upon itself in a plurality of convolutions, the said wire being substantially sector-shaped in cross-section, and provided on its exterior with a depression to form a groove on the exterior of the gromet.

16. A circular gromet comprising a wire wound upon itself in a plurality of convolutions, the said wire having sides which taper toward the center of the gromet, and provided on its exterior with a depression to form a groove on the exterior of the gromet.

17. A circular gromet comprising a wire wound upon itself in a plurality of spiral convolutions, the wire having sides which taper toward the center of the gromet, one outer corner of the wire being provided with a projection, and the other outer corner being provided with a recess, said projection mating with the recess on the adjacent turn of the wire.

18. A circular gromet comprising a wire wound upon itself in a plurality of spiral convolutions, the wire having sides which taper to a point at the center of the gromet, one outer corner of the wire being provided with a projection, and the other outer corner being provided with a recess, said projection mating with said recess on the adjacent turn of the wire.

FRANK H. BEYEA.